US008082759B2

(12) United States Patent
Okugawa

(10) Patent No.: US 8,082,759 B2
(45) Date of Patent: Dec. 27, 2011

(54) PRODUCING METHOD FOR DRAWN GLASS MEMBER, PRODUCING METHOD FOR SPACER, AND PRODUCING METHOD FOR IMAGE DISPLAY APPARATUS

(75) Inventor: Hirotaka Okugawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 11/481,795

(22) Filed: Jul. 7, 2006

(65) Prior Publication Data
US 2007/0023134 A1 Feb. 1, 2007

(30) Foreign Application Priority Data
Aug. 1, 2005 (JP) .................................. 2005-222651

(51) Int. Cl.
*C03B 37/15* (2006.01)
(52) U.S. Cl. ................................ 65/407; 65/406; 65/411
(58) Field of Classification Search ................ 65/36–43, 65/53–55, 58, 152, 155, 156
See application file for complete search history.

(56) References Cited

U.S. PATENT DOCUMENTS

| | | | | |
|---|---|---|---|---|
| 4,407,667 A | * | 10/1983 | Le Noane et al. ................ 65/407 |
| 6,098,429 A | * | 8/2000 | Mazabraud et al. ............. 65/392 |
| 7,078,854 B2 | | 7/2006 | Niibori et al. ................... 313/495 |
| 7,148,618 B2 | | 12/2006 | Niibori et al. ................... 313/495 |
| 7,436,110 B2 | | 10/2008 | Niibori et al. ................... 313/495 |
| 2002/0100295 A1 | * | 8/2002 | Terashima et al. .............. 65/416 |
| 2005/0223748 A1 | * | 10/2005 | Ames et al. ...................... 65/407 |

FOREIGN PATENT DOCUMENTS

| CN | 1476043 | 2/2004 |
|---|---|---|
| JP | 5-279067 | 10/1993 |
| JP | 2005-211940 | * 8/2005 |

OTHER PUBLICATIONS

Adachi, JP 2005-211940 machine translation as provided by http://dossier1.ipdl.inpit.go.jp/AIPN/odse_top_dn.ipdl?N0000=7400 viewed on Oct. 14, 2010.*
Chinese Office Action dated Apr. 10, 2009, in related corresponding Chinese Patent Appin. No. 200610109105.6.

* cited by examiner

*Primary Examiner* — Matthew Daniels
*Assistant Examiner* — Jodi C Franklin
(74) *Attorney, Agent, or Firm* — Fitzpatrick, Cella, Harper & Scinto

(57) ABSTRACT

A method for producing a drawn glass member includes a step of thermally softening and drawing a first end of a first glass base material, and a step of thermally bonding together a second end of the first glass base material, having the first end thermally softened and drawn, with one end of a second glass base material to form a thermally bonded portion. The step of thermally bonding together the second end of the first glass base material with the one end of the second glass base material is executed, while pressing, along a direction of the drawing, a side plane of at least one of the first and second glass base materials including the thermally bonding portion so as to keep a cross-sectional shape of at least one of the first and second glass base materials.

7 Claims, 4 Drawing Sheets

PRODUCING METHOD FOR DRAWN GLASS MEMBER, PRODUCING METHOD FOR SPACER, AND PRODUCING METHOD FOR IMAGE DISPLAY APPARATUS

BACKGROUND OF THE INVENTION

1. Field of the Invention

The present invention relates to a producing method for a drawn glass member by a thermal drawing method, a producing method for a spacer for an image display apparatus and a producing method for an image display apparatus, utilizing the same.

2. Related Background Art

It is already known to continuously draw one end of a glass base member, softened by heating in a heating oven, out of the heating oven and to cool it under drawing by driving rollers or belts, thereby obtaining a drawn glass member of a cross-sectional shape similar to that of the glass base material. Such process is utilized for example for producing an optical fiber base material or a spacer of a flat-panel image display apparatus.

Among these, a producing method for an optical fiber will be explained as an example. A continuous drawing of an optical fiber base material is executed in a heating oven, while a lower end of another optical fiber base material is fused to an upper end of the optical fiber base material, under drawing in the heating over, by means of fusing means such as an electric oven or a flame burner provided in an upper part of the heating oven. There are known a producing method and a producing apparatus, capable of continuously drawing plural base materials in this manner (for example see Japanese Patent Application Laid-Open No. H05-279067).

However, a mutual fused adjoining of the glass base materials as disclosed in Japanese Patent Application Laid-Open No. H05-279067 involves a drawback that the glass base materials in the vicinity of a fused portion shows a deformation, whereby a uniform cross-sectional shape cannot be obtained in the base material.

SUMMARY OF THE INVENTION

An object of the present invention is to thermally bond mutually glass base materials during a drawing operation so as to form a uniform cross-sectional shape of the base materials even in the thermally bonded portion, thereby obtaining a uniform and highly precise drawn glass member in continuous manner.

DETAILED DESCRIPTION OF THE PREFERRED EMBODIMENTS

Figure 1:
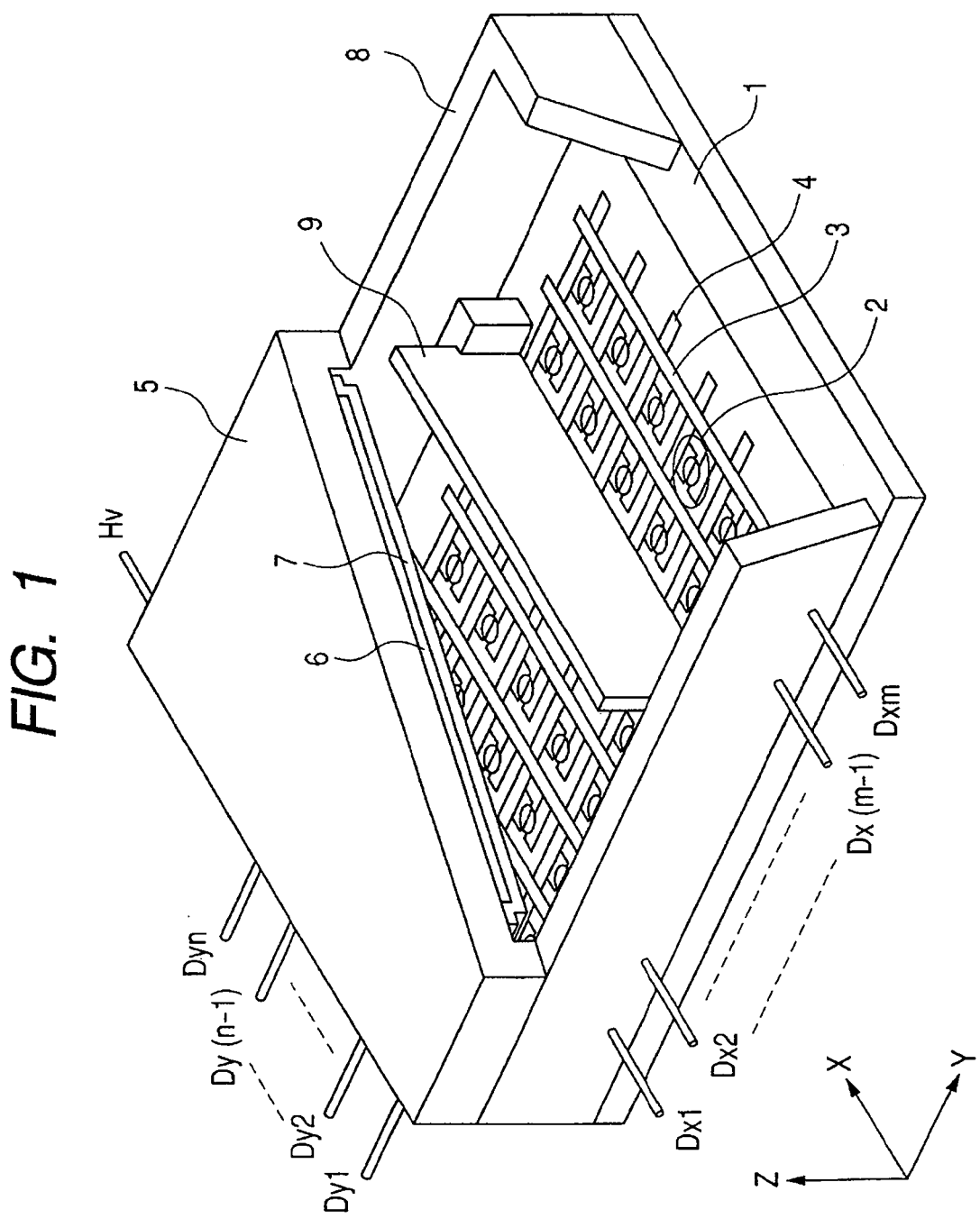
FIG. 1 is a schematic view of an image display apparatus utilizing a spacer of the present invention.

The present invention provides, in a first aspect thereof, a producing method for a drawn glass member including a step of thermally softening and drawing one end of a one glass base material, and a step of thermally bonding the other end of the one glass base material with one end of the other glass base material, wherein the step of thermally bonding the other end of the one glass base material with one end of the other glass base material is executed while smoothing a side plane along a direction of the drawing of the one or the other glass base material including thermally bonded portions.

The producing method for the drawn glass member of the present invention includes, as preferable embodiments, that the step of thermally bonding the other end of the one glass base material with the one end of the other glass base material is executed during the drawing step of the one end of the one glass base material, and that the step of thermally bonding the other end of the one glass base material with the one end of the other glass base material is executed by aligning the ends of the base materials by a smoother tool.

Also the present invention provides, in a second aspect thereof, a producing method for a spacer for use in an image display apparatus including a rear plate having plural electron-emitting devices, a face plate disposed in opposition to the rear plate and provided with a phosphor member which emits light by an irradiation with electrons emitted from the electron-emitting devices, a frame member provided in a peripheral portion of the rear plate and the face plate and constituting a hermetically sealed container together with both plates, and a spacer provided between the rear plate and the face plate and serving to maintain a distance between both plates, wherein the spacer is manufactured by a drawn glass member produced by the aforementioned producing method for the drawn glass member of the present invention.

Also the present invention provides, in a third aspect thereof, a producing method for an image display apparatus including a rear plate having plural electron-emitting devices, a face plate disposed in opposition to the rear plate and provided with a phosphor member which emits light by an irradiation with electrons emitted from the electron-emitting devices, a frame member provided in a peripheral portion of the rear plate and the face plate and constituting a hermetically sealed container together with both plates, and a spacer provided between the rear plate and the face plate and serving to maintain a distance between both plates, wherein the spacer is produced by a drawn glass member produced by the aforementioned producing method for the drawn glass member of the present invention.

According to the present invention, in thermally bonding the one glass base material to the other glass base material, it is advantageously prevented that the cross-sectional shape of the base materials becomes uneven by a deformation of the base materials in the thermally bonded portion thereof, thereby maintaining a constant cross-sectional shape in a direction perpendicular to the drawing direction of the base material. Therefore, the drawing can be executed from a glass base material of a constantly uniform cross-sectional shape, thereby providing an uniform and satisfactory drawn glass member in continuous manner. Also such drawn glass member may be used for producing a spacer, thereby easily providing an image display apparatus of a high quality.

The present inventors have drawn attention to facts that, in the aforementioned prior thermally bonding method of the glass base materials, the glass base material has caused a plastic deformation by the weight thereof and that, in the mutual fusion of the glass base materials, a pressing of one glass base material to the other glass base material has deteriorated the precision of the cross-sectional shape of the glass base materials, and have thus made the present invention.

The producing method for the drawn glass member of the present invention is applicable not only for producing a spacer for an image display apparatus, but also for producing, for example, a base material for an optical fiber. As the spacer for the image display apparatus requires a particularly high dimensional precision, the producing method of the present invention, capable of attaining a precision of plus/minus several micrometers in the shape reproducibility, is advantageously applied in producing such spacer for the image display apparatus.

In the following, the present invention will be clarified in detail, taking a producing method for a spacer of an image display apparatus as an example.

FIG. 1 is a schematic view of an image display apparatus, in which applied is a spacer produced with the producing method for the drawn glass member of the present invention.

Referring to the apparatus shown in FIG. 1, a rear plate 1 is provided with electron sources, formed by plural electron-emitting devices 2, which are wired in a matrix structure by plural row wirings 3 and plural column wirings 4.

Also a face plate 5 is provided with a phosphor 6 and a metal back 7, constituting an anode electrode.

In such image display apparatus, the electron sources on the rear plate 1 emit electrons according to an image signal. The electrons are accelerated by the metal back 7, formed on the face plate 5 and given a high voltage of 1 to 20 kV, and irradiates the phosphor 6, thereby displaying an image corresponding to the image signal. The electron-emitting device 2 constituting the electron source may be formed by a field emission device (FE), an MIM-type electron-emitting device, or a surface conduction electron-emitting device, already known in the art.

The rear plate 1 and the face plate 5 are adhered, by a sealant, to a frame member 8 positioned therebetween, and a hermetically sealed container is formed by the rear plate 1, the face plate 5 and the frame member 8.

The interior of such hermetically sealed container is maintained at a vacuum of $10^{-4}$ to $10^{-6}$, and plural spacers 9 are provided in the hermetically sealed container as structural members for supporting the hermetically sealed container from the internal side thereof, against the atmospheric pressure applied on the container.

In the following, an embodiment of the producing method for producing the spacer for the image display apparatus will be explained with reference to FIG. 2.

Figure 2:
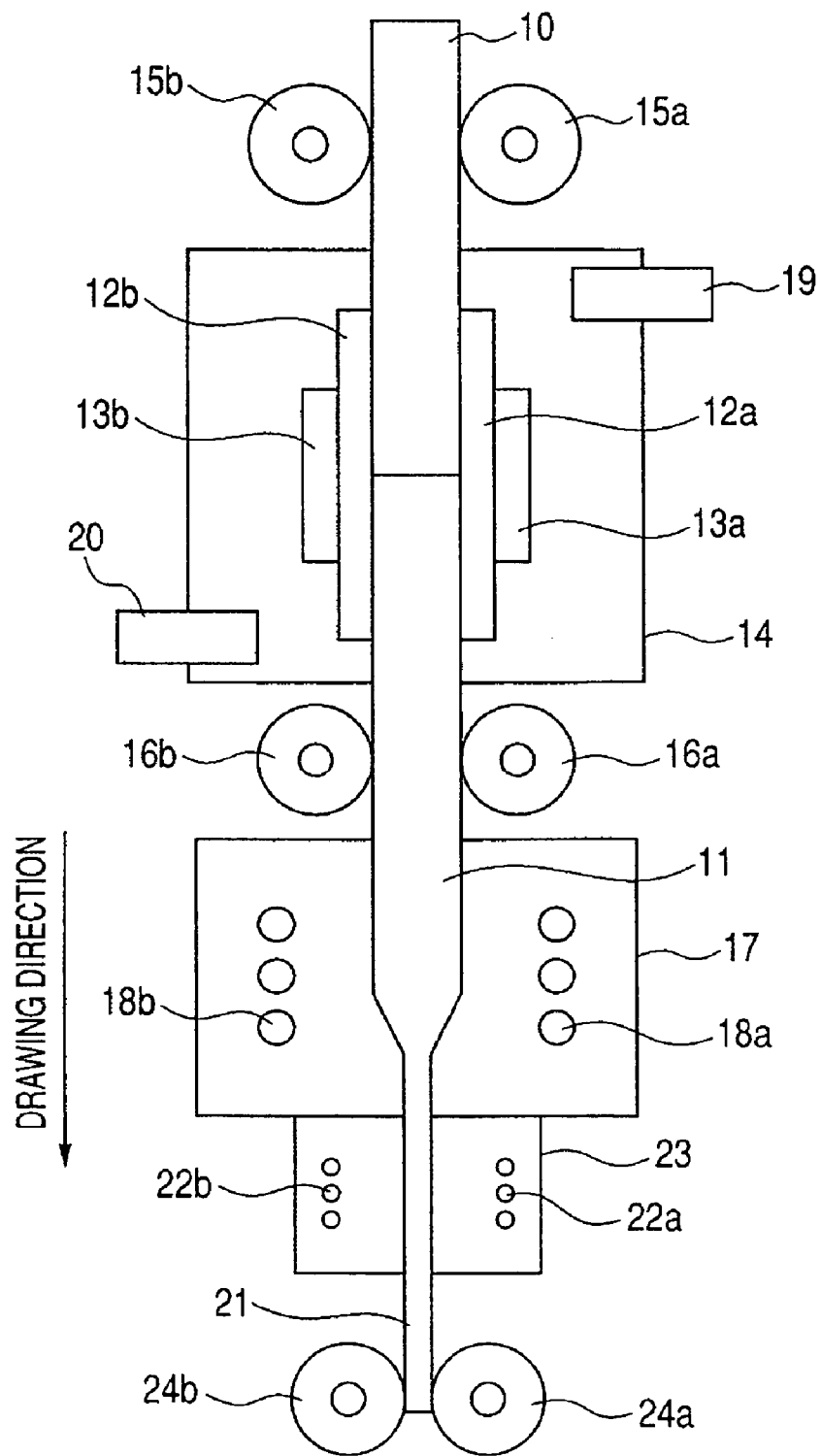
FIG. 2 is a schematic view showing an embodiment of a producing method for a drawn glass member of the present invention.

FIG. 2 is a schematic view showing a preferred embodiment of the producing method for the drawn glass member of the present invention.

A drawn glass member 21, for use in the spacer 9 of the image display apparatus, is obtained by drawing a glass base material 10. As the glass base material 10, for example a glass material SK18, produced by Sumita Kogaku Co., may be utilized. The glass base material 10 is so formed as to have a cross-sectional shape, perpendicular to the drawing direction, similar to the cross-sectional shape of the drawn glass member 21.

At first, an end of the glass base material 11 formed in a predetermined shape is supported by a base material feeding apparatus 16a, 16b. The glass base material 11 is gradually lowered by the base material feeding apparatus 16a, 16b and introduced, at an end thereof, into a heating oven 17 incorporating heaters 18a, 18b, whereby such end portion of the glass base material 11 is heated and softened to a temperature allowing continuous extraction and drawing. Such heating temperature is suitably selected at or above a softening temperature of the glass base material 11.

The feeding rate of the glass base material 11 by the base material feeding apparatus 16a, 16b into the heating oven is usually selected as about 1 to 5 mm/min. The interior of the heating oven 17 is set at such a temperature that, depending on the type of the glass base material 11, the end of the glass base material 11 fed into the heating oven 17 has a viscosity of $\log\eta=7.0$ to 7.9 poise. Also such temperature is preferably controlled with a precision of ±0.1° C. in consideration of the stability of drawing.

The end of the glass base material 11, heated to the aforementioned temperature in the heating oven 17, is softened, suspended and drawn into a drawn glass member 21, which is extracted under drawing from the heating oven 17 into a tubular cover 23 provided in continuation to the heating oven 17.

The cover 23 has a heat insulating property, and can form therein a temperature slope gradually lowering along the drawing direction, by means of heaters 22a, 22b. For example, there may be formed a temperature slope for example from a softening temperature T1 of the glass base material 11 to a solidifying temperature T2 or a lower temperature. The drawn glass member 21 moves in the cover 23 under drawing and is cooled to the solidifying temperature T2 of the drawn glass member T2, whereupon the drawing operation is completed.

The drawn glass member 21, cooled to the solidifying temperature in the cover 23 and having completed the drawing operation, is pinched and extracted by a pair of extraction rollers 24a, 24b.

The extracting speed of the drawn glass member 21 by the extraction rollers 24a, 24b is preferably within a range from 1,000 to 5,000 mm/min. Also a ratio of the feeding speed and the extracting speed (extracting speed/feeding speed) is preferably within a range of from 200 to 2,000, for example in order to secure a similarity in the cross-sectional shape between the glass base material 11 and the drawn glass member 21 after the completion of drawing.

The drawing glass member 21, after passing the extraction rollers 24a, 24b, is cut by an unillustrated cutter and is used as a base material for the spacer 9. Such base material may be used directly as the spacer 9 (cf. FIG. 1), but is subjected to further processes for forming spacer 9.

In the course of such drawing process, a glass base material 11 is fused to the glass base material 10.

At the fusing operation, smoothers 12a, 12b are heated by heaters 13a, 13b to such a temperature that the ends of the glass base materials 10, 11 have a viscosity of $\log\eta=7.2$ to 8.5 poise. Such temperature is preferably controlled with a precision of ±1° C. in consideration of the stability of fusing operation. Also the smoothers 12a, 12b particularly preferably have an internal dimension, same as an external dimension of the glass base materials 10, 11. Thus heated smoothers 12a, 12b are contacted with side planes of the glass base materials 10, 11, along the drawing direction of the glass base material 11 and including the portions to be fused, in order that the cross-sectional shape of the glass base materials 10, 11 does not spread in the portions to be adjoined (portions to be fused). Otherwise, it is preferable to execute the heating while the side planes of the glass base materials 10, 11 including the portions to be fused are pressed by the heated smoothers 12a, 12b. Then the glass base material 10 is pressed, by adjoining base material feeding apparatus 15a, 15b, to the glass base material 11, whereby an end of the glass base material 10 to be adjoined is fused to the other end of the glass base material 11.

The smoothers 12a, 12b are preferably formed by a heat-resistant material, such as carbon, an ultra hard steel or a ceramic material. Among these materials, in the case that the smoothers 12a, 12b are formed by an ultra hard steel or a ceramic material, a portion coming into contact with the base material is preferably coated with a precious metal or carbon.

During the fusing operation, the smoothers 12a, 12b are displaced in the drawing direction at a speed same as the feeding speed of the base material feeding apparatus 16a, 16b. After the completion of the fusing operation, the smoothers are moved, by an unillustrated driving apparatus, in a direction perpendicular to the drawing direction, thus being released from the base materials 10, 11. The smoothers then are lifted to a predetermined position inside a cover 14, and wait for a next fusing operation. The above-explained operations are repeated to execute a base material supply enabling a continuous drawing.

Also in order to prevent oxidation of the smoothers 12a, 12b at a high temperature state, the periphery thereof is covered by the cover 14, and the interior thereof is filled with an inert gas such as nitrogen introduced from a gas inlet 20. Also the nitrogen gas is removed, if necessary, from a gas outlet 19 in order to maintain the internal pressure of the cover 14 in a safe state.

Through the above-explained steps, the drawn glass member 21, for used as a base material of the spacer 9, can be produced in continuous manner. In producing the spacer 9 (cf. FIG. 1), the drawn glass member 21 may be subjected to a cutting process for size adjustment, or a process of applying a resistance film on the surface of the drawn glass member 21. This resistance film is formed for the purpose of preventing a surface charging of the spacer 9, by the irradiation with the electrons emitted from the electron source in the image display apparatus shown in FIG. 1.

On the surface of the drawn glass member 21, the resistance film may be formed by evaporation, sputtering, CVD or plasma CVD, and has a thickness of from 10 μm to 1.0 μm, preferably from 50 to 500 nm, and preferably a surface resistance of from $10^7$ to $10^{14}$ Ω/cm.

The resistance film may be formed for example of a metal oxide, in which an oxide of chromium, nickel or copper is preferable, because such oxides have a relatively low secondary electron emitting efficiency and are not easily charged when the spacer is hit by the electrons. In addition to the metal oxides, carbon also has a low secondary electron emitting efficiency and is a preferred material. In particular, amorphous carbon has a high resistance, and is capable of easily controlling the resistance of the spacer at a desired value. As other materials, a nitride of a germanium-transition metal alloy and a nitride of an aluminum-transition metal alloy are easily usable practically, and the resistance can be regulated over a wide range from a conductor to an insulating member by an adjustment of the composition of the transition metals.

The spacer 10, thus prepared, is fixed to the face plate 5 bearing the phosphor 6 and the metal back 7 as shown in FIG. 1, or to the rear plate bearing the electron sources. The frame member 8 is provided with a sealant such as a frit glass or indium. Then an image display panel is prepared by adhering the phase plate 5, the frame member 8 and the rear plate 1, a vacuum chamber, in such a manner that the interior of the hermetically sealed container thus formed has the aforementioned vacuum.

As explained above, the obtained spacer 9 has a satisfactory shape reproducibility. Therefore, a precision in the height between the face plate 5 and the rear plate 1 is as high as within plus/minus several micrometers in a each single spacer 9 or among plural spacers 9, and is capable of preventing a distortion on the image display surface or a buckling or a tumbling of the spacers 9 at or after the sealing of the container. After the image display panel is prepared as described above, a drive circuit for image display is mounted to complete the image display apparatus.

EXAMPLES

Example 1

In the present example, a spacer for an image display apparatus was produced by a method shown in FIG. 2.

Figure 3:
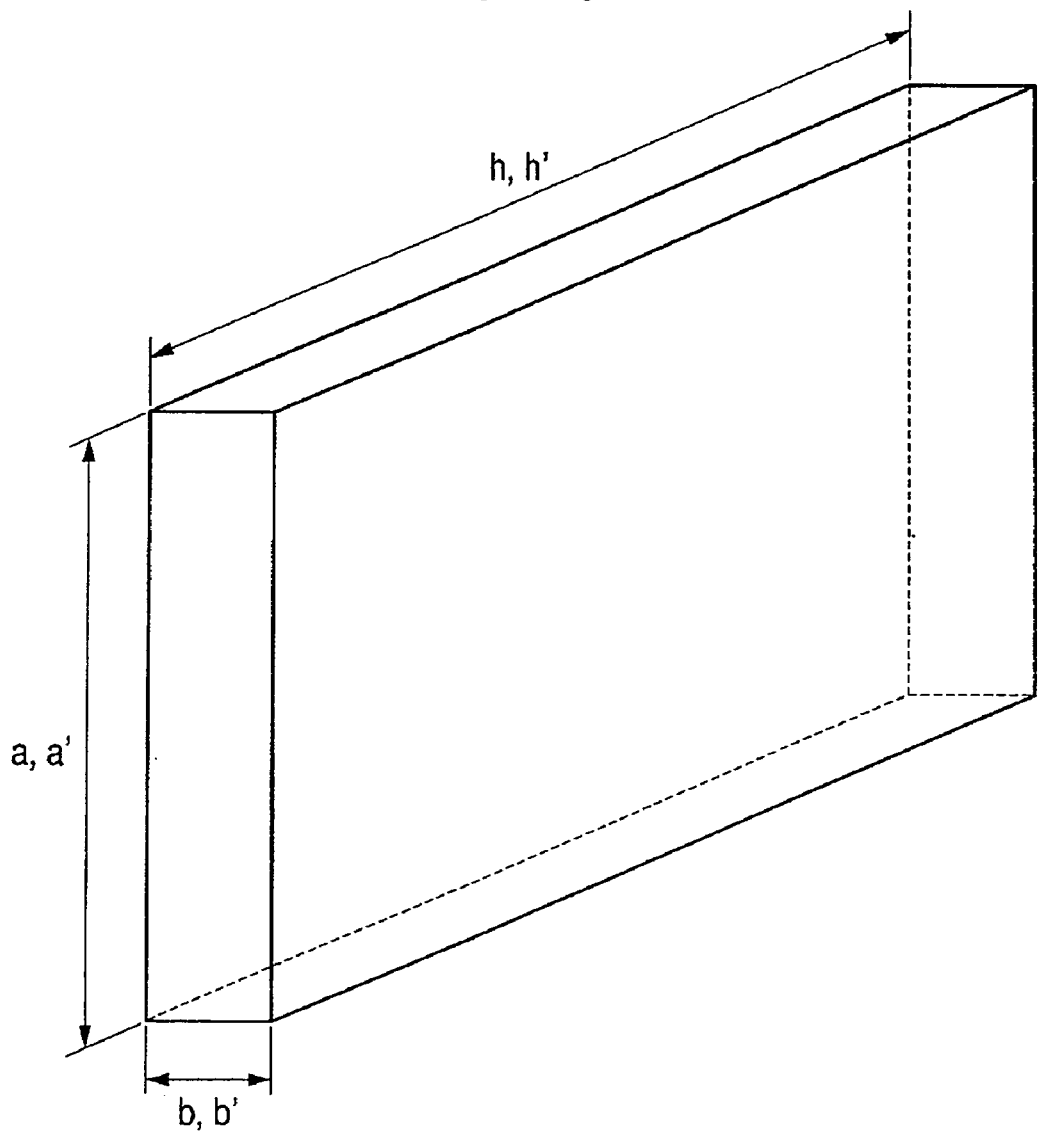
FIG. 3 is a schematic view showing a shape of a glass base material and a drawn glass member embodying the present invention.

As the glass base materials 10, 11, there was employed a glass member having a shape as shown in FIG. 3 with a rectangular cross-sectional shape of a longer side a×shorter side b=49.23 mm×6.15 mm and with a length h=600 mm, and having a softening temperature of 770° C. and a glass transition temperature of 640° C.

The glass base materials 10, 11 were supported, as shown in FIG. 2, by the base material feeding apparatus 16a, 16b and the adjoining base material feeding apparatus 15a, 15b in such a manner that the direction of length h lies in the drawing direction. The glass base materials 10, 11 were lowered with a speed of 5 mm/min, thereby introducing one end of the glass base material 11 into the heating oven 17 incorporating the heaters 18a, 18b, and also introducing the other end of the glass base material 11 and one end of the glass base material 10 into the cover 14. The interior of the heating oven 17 was controlled at a temperature of 780° C. (±0.1° C.) at which the glass base material 11 assumes a viscosity of logη=7.5 poise, while the smoothers 12a, 12b were controlled at a temperature of 780° C. (±0.1° C.) at which the glass base material 11 assumes a viscosity of logη=7.5 poise.

The smoothers 12a, 12b had an internal dimension same as the external dimension of the glass base materials 10, 11, and were contacted, as shown in FIG. 2, with the side planes of the glass base material 11, including the fused portion along the drawing direction thereof.

The one end of the glass base material 11 introduced into the heating oven 17 was softened and suspended under drawing, and thus drawn glass member 21 was passed through the cover 23 provided in continuation to the heating oven 17.

The cover 23 was formed with stainless steel having an excellent heat insulating property, same as that employed for an external wall of the heating oven 17. The cover 23 had a length of 120 mm from the lower end of the heating oven 17.

After passing the cover 23, the already solidified drawn glass member 21 was extracted by a pair of extracting rollers 24a, 24b, with an extracting speed of 4733 mm/min, and with a ratio (extracting speed/feeding speed)=ca. 947.

The drawing operation was so conducted that the drawn glass member 21 had a cross-sectional shape of longer side a'×shorter side b'=1.6 mm×0.2 mm, and 10 drawn glass members 21 were prepared after passing the extracting rollers 24a, 24b.

In a measurement of dimensional precision of such 10 drawn glass members, a dimensional fluctuation in the longer side a' and the shorter side b' along the length h' in individual drawn glass member 21 was ±2 μm in the longer side a' and ±1 μm in the shorter side b'.

On the surface of thus obtained drawn glass member 21, a resistance film formed by a nitride of tungsten and germanium was formed with a thickness of 200 nm. The resistance film was formed by a reactive sputtering utilizing a W-Ge target in a mixed gas atmosphere of argon and nitrogen. The tungsten-germanium nitride film had, after film formation, a specific resistivity of $7.9 \times 10^3$ Ω·m. Also on faces coming into contact with the row wiring 3 and the metal back 7, shown in FIG. 1, Pt electrodes were formed by sputtering, thereby completing a spacer 9 for the image display apparatus.

The spacer 9 was fixed on the row wiring 3 of the rear plate 1 as shown in FIG. 1, and then a frame member 8 was fixed on the rear plate 1.

After indium as a sealant was coated on the frame member 8, such rear plate 1 and the face plate 5 bearing the phosphor 6 and the metal back 7 were conveyed into a vacuum chamber maintained at a vacuum of $10^{-6}$ Pa. Then the sealant was heated to adhere the face plate 1 to the frame member 8, thereby obtaining an image display panel. Thereafter, a drive circuit for image display was mounted to complete an image display apparatus.

The image display apparatus of the present example, thus produced, was of a high quality, without a distortion of the image display plane and without a buckling or a tumbling of the spacers at or after the sealing operation.

Example 2

In the present example, a spacer for an image display apparatus was produced by a method shown in FIG. 2, as in Example 1.

Figure 4:
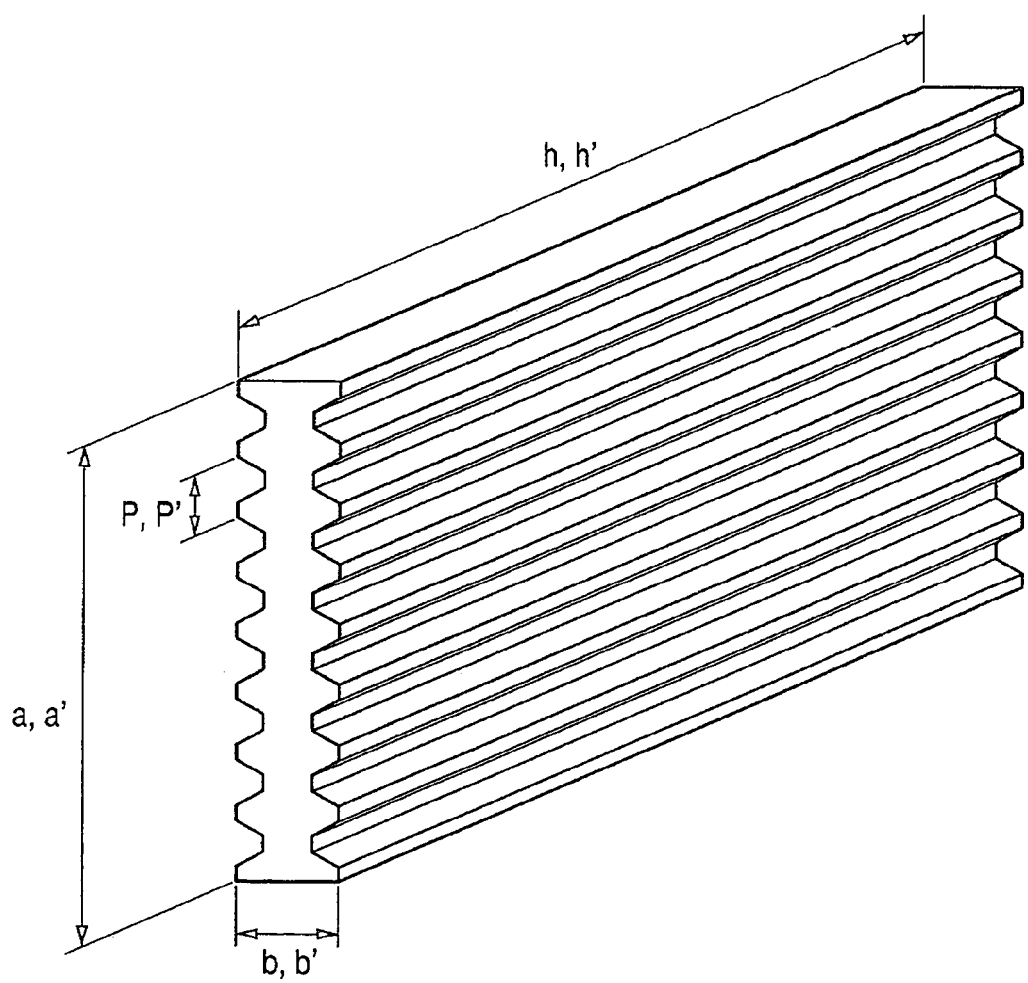
FIG. 4 is a schematic view showing a shape of a glass base material and a drawn glass member embodying the present invention.

As the glass base materials 10, 11, there was employed a glass member having a shape as shown in FIG. 4 with a rectangular cross-sectional shape of a longer side a×shorter side b=49.23 mm×6.15 mm and with a length h=600 mm, and having a softening temperature of 770° C. and a glass transition temperature of 640° C. Also the glass base materials 10, 11 are provided, on both surfaces of the longer sides a, with plural grooves extending in the direction of length h, with a pitch P of about 1 mm, thus having irregularities on both surface of the longer sides a.

The glass base materials 10, 11 were supported, as shown in FIG. 2, by the base material feeding apparatus 16a, 16b and the adjoining base material feeding apparatus 15a, 15b in such a manner that the direction of length h lies in the drawing direction. The glass base materials 10, 11 were lowered with a speed of 5 mm/min, thereby introducing one end of the glass base material 11 into the heating oven 17 incorporating the heaters 18a, 18b, and also introducing the other end of the glass base material 11 and one end of the glass base material 10 into the cover 14. The interior of the heating oven 17 was controlled at a temperature of 780° C. (±0.1° C.) at which the glass base material 11 assumes a viscosity of $\log\eta$=7.5 poise, while the smoothers 12a, 12b were controlled at a temperature of 780° C. (±0.1° C.) at which the glass base material 11 assumes a viscosity of $\log\eta$=7.5 poise.

The smoothers 12a, 12b had an internal dimension same as the external dimension of the glass base materials 10, 11, and were contacted, as shown in FIG. 2, with the side planes of the glass base material 11, including the fused portion along the drawing direction thereof.

The one end of the glass base material 11 introduced into the heating oven 17 was softened and suspended under drawing, and thus drawn glass member 21 was passed through the cover 23 provided in continuation to the heating oven 17.

The cover 23 was formed with stainless steel having an excellent heat insulating property, same as that employed for an external wall of the heating oven 17. The cover 23 had a length of 120 mm from the lower end of the heating oven 17.

After passing the cover 23, the already solidified drawn glass member 21 was extracted by a pair of extracting rollers 24a, 24b, with an extracting speed of 4733 mm/min, and with a ratio (extracting speed/feeding speed)=ca. 947.

The drawing operation was so conducted that the drawn glass member 21 had a cross-sectional shape of longer side a'×shorter side b'=1.6 mm×0.2 mm, and 10 drawn glass members 21 were prepared after passing the extracting rollers 24a, 24b.

In a measurement of dimensional precision of such 10 drawn glass members, a dimensional fluctuation in the longer side a' and the shorter side b' along the length h' in each drawn glass member 21 was ±2 μm in the longer side a' and ±1 μm in the shorter side b'. Also in each drawn glass member 21, a fluctuation in the groove pitch P' along the length direction h' was ±0.1 μm and a fluctuation in the pitch P' between the parallel grooves was ±0.3 μm. Also among 10 drawn glass member 21, a fluctuation in the dimension of the longer side a' was ±4 μm, a fluctuation in the dimension of the shorter side b' was ±2 μm, and a fluctuation in the groove pitch P' was ±0.5 μm.

On the surface of thus obtained drawn glass member 21, a resistance film formed by a nitride of tungsten and germanium was formed with a thickness of 200 nm. The resistance film was formed by a reactive sputtering utilizing a W-Ge target in a mixed gas atmosphere of argon and nitrogen. The tungsten-germanium nitride film had, after film formation, a specific resistivity of $7.9 \times 10^3$ Ω·m. Also on faces coming into contact with the row wiring 3 and the metal back 7, shown in FIG. 1, Pt electrodes were formed by sputtering, thereby completing a spacer 9 for the image display apparatus.

The spacer 9 was fixed on the row wiring 3 of the rear plate 1 as shown in FIG. 1, and then a frame member 8 was fixed on the rear plate 1.

After indium as a sealant was coated on the frame member 8, such rear plate 1 and the face plate 5 bearing the phosphor 6 and the metal back 7 were conveyed into a vacuum chamber maintained at a vacuum of $10^{-6}$ Pa. Then the sealant was heated to adhere the face plate 1 to the frame member 8, thereby obtaining an image display panel. Thereafter, a drive circuit for image display was mounted to complete an image display apparatus.

The image display apparatus of the present example thus produced, was of a high quality as in Example 1, without a distortion of the image display plane and without a buckling or a tumbling of the spacers at or after the sealing operation.

This application claims priority from Japanese Patent Application No. 2005-222651 filed on Aug. 1, 2005, which is hereby incorporated by reference herein.

What is claimed is:

1. A method for producing a drawn glass member, comprising:

a step of thermally softening and drawing a first end of a first glass base material in a drawing direction; and a step of thermally bonding together a second end of the first glass base material, having the first end thermally softened and drawn, with one end of a second glass base material, wherein the step of thermally bonding together the second end of the first glass base material with the one end of the second glass base material is executed using a pair of smoothers having an internal dimension corresponding to an external dimension of the first and second glass base materials; and pressing, in a direction transverse to the drawing direction with the smoothers, an adjoined portion at which the second end of the first glass base material and the one end of the second glass base material are thermally bonded, so as to keep a cross-sectional shape of at least one of the first and second glass base materials, wherein the smoothers are moved in the drawing direction at a same speed as the feeding speed of the first and second glass base materials during the thermally bonding operation, and after completion of the thermally bonding operation, the smoothers are moved in a direction perpendicular to the drawing direction so as to be released from the first and second glass base materials.

2. A producing method according to claim 1, wherein the pressing is executed by pressing the adjoined portion with heated smoothers.

3. A producing method according to claim 2, wherein the pressing is executed while moving the smoothers along a direction of the drawing.

4. A producing method according to claim 1, wherein pressing of the boundary portion in the transverse direction is applied as the first and second glass base materials are moving in the drawing direction.

5. A method for producing a drawn glass member, comprising:

a step of thermally softening and drawing a first end of a first glass base material in a drawing direction;

a step of thermally bonding together a second end of the first glass base material, having the first end thermally softened and drawn, with one end of a second glass base material to form an adjoining portion;

a step of pressing against the adjoining portion in a direction transverse to the drawing direction as the adjoining portion moves in the drawing direction; and a step of providing first and second smoothers to perform the pressing, wherein the first and second smoothers are moved in the drawing direction at a same speed as the feeding speed of the first and second glass base materials during the thermally bonding operation, and after completion of the thermally bonded operation the first and second smoothers are moved in a direction perpendicular to the drawing direction.

6. A producing method according to claim 5, further comprising the step of heating the first and second smoothers.

7. A producing method according to claim 5, further comprising the step of moving the first and second smoothers in the drawing direction during the pressing.

* * * * *